UNITED STATES PATENT OFFICE.

JOSEPH KOETSCHET AND JOANNES CLAUDE ANTOINE MEYER, OF LYON, FRANCE; SAID KOETSCHET ASSIGNOR TO SOCIÉTÉ CHIMIQUE DES USINES DU RHÔNE, ANCIENNEMENT GILLIARD P. MONNET ET CARTIER, OF PARIS, FRANCE, A CORPORATION OF FRANCE.

MANUFACTURE OF ZINC SULFID.

1,001,415. Specification of Letters Patent. Patented Aug. 22, 1911.

No Drawing. Application filed October 19, 1909. Serial No. 523,497.

*To all whom it may concern:*

Be it known that we, JOSEPH KOETSCHET, of 24 Quai Claude Bernard, Lyon, France, chemist, and JOANNES CLAUDE ANTOINE MEYER, of 208 Avenue Felix Faure, Lyon, France, engineer, have invented certain new and useful Improvements in the Manufacture of Zinc Sulfid, of which the following is a specification.

Zinc sulfid has long been known as a valuable body pigment. It would already have replaced white lead if the sulfid as precipitated from alkaline or acid solution, or the oil paint containing such sulfid, had not had the objectionable property of turning yellow under the effects of light and air, which renders it useless as a painting color. Most of the processes which have been proposed for overcoming this drawback are based upon partial or entire dehydration of the precipitated sulfid at high temperatures (exceeding 300°) with or without addition of chemical agents. All these processes fulfil their purpose imperfectly. The products obtained are the more resistant to the action of light and air and the less liable to turn yellow the better they are dehydrated. But here a new difficulty is encountered. The zinc sulfid becomes discolored and loses in covering power when heated to high temperatures. Moreover the product gradually blackens when exposed to the air and this hitherto unexplained alteration often sets in very rapidly. These disadvantages cannot be entirely avoided even by working with materials free from chlorin (English patent Fischer 17,956 of 1903). The problem has therefore remained unsolved up to the present since, as before stated, the means proposed for obviating the difficulty are attended by other difficulties not less great. The surprising discovery has now been made that zinc sulfid, and especially that precipitated from acid solution, is readily dehydrated almost completely, if it is allowed to remain for a considerable time in contact with a weakly acid solution, even at ordinary temperature. This dehydration is attended by a remarkable alteration in the structure of the product, the covering power of which becomes greatly increased. The property of yellowing or blackening in the air entirely disappears, and the new product is therefore remarkably suitable for replacing white lead as a pigment. By mixing the product with barium sulfate or other substances, synthetic products similar to lithopone can be obtained which will not blacken in the light.

The process can be carried into effect in various ways. Its details, time of reaction, quantity and concentration of the acid, temperature, and kind of sulfid employed, are interdependent, so that the conditions of working can be varied within wide limits.

Example 1: Hydrated sulfid of zinc, precipitated from acid solution, is filtered and imperfectly washed, so that it remains impregnated with a dilute solution of an acid or of an acid salt (a solution of 2 per cent. sulfuric acid suffices). After the sulfid has remained in contact with the acid for 14 days at ordinary temperature the conversion may be regarded as practically complete and the product is thoroughly washed and dried. One can even, after the greater part of the acid has been removed by washing with water, neutralize the remainder with an alkali, alkali earth or carbonate in excess, in presence or not of a soluble zinc salt. The neutral or alkaline product is again washed and dried.

Example 2: The mixture specified in the foregoing example is heated at about 80° C. and the conversion is then effected in a much shorter time, say about 24–26 hours.

On comparing the product with the original material, it will be found that the texture has changed and that the water has almost entirely disappeared and further that paint prepared therewith is very permanent.

If the sulfid of zinc used has not been prepared in acid solution, a small quantity of dilute acid is added as above explained to bring about the conversion.

What we claim and desire to secure by Letters Patent is:—

1. A process for the manufacture of sulfid of zinc, comprising submission of precipitated zinc sulfid to prolonged contact with dilute acid.

2. A process for the manufacture of sulfid of zinc, comprising submission of precipitated zinc sulfid to prolonged contact with dilute acid, with application of heat, substantially as described.

3. A process for the manufacture of sulfid of zinc, comprising precipitation of zinc sulfid from an acid bath and allowing the precipitated sulfid to remain in prolonged contact with dilute acid, substantially as described.

4. A process for the manufacture of sulfid of zinc, comprising precipitation of zinc sulfid from an acid bath, allowing the precipitated sulfid to remain in prolonged contact with dilute acid, and applying heat during such contact, substantially as described.

In witness whereof, we have hereunto signed our names in the presence of two subscribing witnesses.

JOSEPH KOETSCHET.
JOANNES CLAUDE ANTOINE MEYER.

Witnesses:
MARIN VACHON,
THOMAS N. BROWNE.